3,033,671
METHOD OF RECOVERING NICKEL AND IRON FROM LATERITE ORES BY PREFERENTIAL REDUCTION

Michio Uemura, Anjo, Aichi Prefecture, Japan, assignor to Tohoku Denki Seitetsu Kabushiki Kaisha, a corporation of Japan
No Drawing. Original application June 25, 1958, Ser. No. 744,355. Divided and this application Feb. 6, 1961, Ser. No. 87,084
8 Claims. (Cl. 75—21)

This application is a division of copending application Serial No. 744,355, filed June 25, 1958, now Patent No. 2,995,455, granted August 8, 1961.

The present invention relates to methods for the recovery of iron and nickel from laterite ores.

The principal object of the present invention is the provision of high grade pig iron or raw steel, of low phosphorous, sulphur and copper contents, from the inexhaustible deposits of laterite ore in the Philippines, Cuba and other tropical regions, which have not yet been exploited or utilized industrially.

Another object of the present invention is the separation and recovery of nickel and chromium as by-products, with the residual slag being recovered in the form of alumina cement, whereby all of the components of the laterite ore may be effectively utilized on an industrial scale.

Other objects, features and advantages of the present invention will become apparent from the following description.

In general, laterite ore contains around 50% iron as its principal component, with about 1% nickel and 2% chromium as minor constituents, and with about 8% alumina and about 2% silica as impurities, together with about 10% moisture and about 12% combined water. It is in the form of a weathered ore, earthy or powdered.

The composition of these laterite ores varies, depending on the region of the deposit. Generally, however, it is as follows (on a dry basis):

| | Percent |
|---|---|
| Fe | 47.0–54.0 |
| Cr | 1.0–2.9 |
| Ni | 0.12–1.3 |
| P | 0.01–0.08 |
| S | 0.25–0.42 |
| MnO | 0.3–2.3 |
| $SiO_2$ | 1.3–5.0 |
| $Al_2O_3$ | 6.0–11.0 |
| CaO | 0.6–1.0 |
| MgO | 0.2–0.87 |
| $H_2O$ (combined) | 11.0–13.67 |
| $H_2O$ (free) | 3.0–11.0 |

When the above-described ore is submitted to smelting to make pig iron, most of the nickel and chromium will be reduced along with the iron and will be included in the pig iron. As is well known, it is relatively easy to remove chromium from nickel-chromium-containing pig iron, but it is almost impossible to remove nickel therefrom. Pig iron containing nickel may be used when its particular characteristics are called for, but for more general use it is desirable to produce pig iron low in nickel. To this end, it is desirable to remove the nickel from the laterite ore by pretreating the ore prior to smelting the ore.

Various methods for removing nickel from low nickel ores have been proposed, among them being wet and dry methods. These known methods, however, although technically workable, have not been successful industrially because production costs have been uneconomically high. This is especially true with low nickel ores such as those having nickel contents below 1%.

Some years ago, a method for removing nickel from iron ore was invented in Japan and became the subject of Japanese Patent No. 206,710. According to this method, laterite ore is first admixed with water in an amount of 10–30% and then submitted to so-called preferential reduction in an electric furnace with no added materials other than a carbonaceous reducing agent in an amount only just sufficient to obtain ferro-nickel from the nickel contained in the ore, so that the nickel content of the ore is separated in the form of ferro-nickel. The disadvantage of this method, however, is that it may be practiced only in an electric furnace of small capacity and is not adapted for large scale industrial application. This is because water is added to the contents of the furnace to agitate the furnace contents by the generation of steam, with the object of accelerating the reaction by such agitation and at the same time causing the particles of ferro-nickel to agglomerate. Such agitation by steam formation is not dangerous in the case of electric furnaces of small size, but such agitation is very dangerous indeed in the case of larger electric furnaces and would quite likely give rise to serious or even fatal injuries to operators. Accordingly, the known method involving generated steam is not practical for large scale production.

By the present invention, there is now provided a preferential reduction method which is adapted to large scale production and which accordingly is a distinct improvement over the known methods. Specifically, according to the present invention, laterite ore is mixed with about 2–3% by weight of a flux such as quicklime or limestone and about 1% by weight of an alkali halide such as sodium chloride or potassium chloride. No water is added. The mixture is further admixed with a carbonaceous reducing agent such as powdered charcoal or coke in an amount sufficient preferentially to reduce the nickel content of the ore to ferro-nickel. The mixture is then melted in an electric furnace at the temperature of 1450–1550° C. to recover the nickel in the ore as ferro-nickel. As no water is added, the quantity of gas generated will be slight and no appreciable agitation will occur even when the method is practiced in large electric furnaces. Moreover, the alkali halide enormously improves electrical conductivity as compared to the previous method using water instead of alkali halide. In the case of the water method, the power requirements of the process are initially quite high, while in the case of the alkali halide method of the present invention, with preferably only a small amount of water present, the start-up power requirements can be easily supplied. Also, the alkali halide lowers the melting point of the ore in cooperation with the flux and promotes the melting of the ore. As another result, the lower melting point of the melt assures that the viscosity of the molten ore at a given temperature will be correspondingly lower, with the result that the reduced particles of ferro-nickel in liquid phase may more easily separate and coalesce into a single body of liquid.

Another beneficial result of the invention is that the added alkali halide gradually escapes in vapor phase as the temperature rises. This vaporization of alkali halide apparently contributes to the separation and coalescence of the reduced liquid ferro-nickel particles. By contrast, in the prior art, the separation and coalescence of reduced liquid ferro-nickel particles is greatly impeded and the percent yield of ferro-nickel is lower than would be expected. As will appear later on, the yield of the present invention is surprisingly high, the recovery of nickel according to the present invention being in excess of 90%. These remarkable results are attributable to the fluxing action of the alkali halide vapor in combination with the reduction in viscosity of the melted ore due to the admixture of alkali halide therein.

As indicated above, the reduced ferro-nickel collects readily in the furnace bottom in a single body of liquid and is easily separated from the melted ore residue by tapping. For example, by the practice of this invention, ferro-nickel having a nickel content of 23% can be obtained with a yield of over 90% from laterite ore containing nickel in an amount about 0.7%, as will be described later in greater detail.

As the added alkali halide vaporizes almost completely, no alkali halide remains in the melted ore residue after the nickel values have been separated and recovered. This feature is quite important to the utilization of the melted ore residue, for as will be described in greater detail later, when the chromium-containing pig iron is separated after smelting, the remaining slag is wholly recovered as alumina cement. If alkali halide should remain in this slag, it would show up in the alumina cement and would reduce the quality of the cement. But as the alkali halide vaporizes almost entirely in the present process, the properties of the alumina cement are unimpaired.

In the past, it has been necessary to pretreat earthy or powdered laterite ores in order to make them lumpy. This has been done by briquetting, sintering or pelletizing the ores and has thus rendered the ores suitable for large scale smelting of iron ore directly from such raw materials. But when laterite ore is submitted to the preferential reduction of nickel according to the present invention, not only is the nickel content of the ore virtually completely recovered as ferro-nickel, but also the ore is fused to a form that can be readily crushed to lump form suitable for smelting. Accordingly, the present invention not only recovers the nickel values but also imparts to the ore a desirable physical form for further smelting.

Moreover, the fused residue remaining after pre-treatment according to the present invention to remove ferro-nickel in reduced form, is completely dry. This means that the iron content of the fused residue is correspondingly increased relative to the iron content of a raw ore, and the fused residue is accordingly in a more readily reducible state.

Although the present invention is disclosed in connection with the removal of nickel from laterite ores, it is to be understood that the method of the present invention can be applied to low nickel ores other than those strictly termed laterite ores, so that the following description and the appended claims are to be construed in that broader sense.

Turning now to the smelting of the ore residues remaining after the recovery of nickel therefrom, it should be noted that the reason why laterite ore has not heretofore been used alone as raw material for the manufacture of iron is that such ores are of high alumina and low silica content. High alumina renders the resulting slags only sparingly fusible. To get a suitable slag, it is necessary to lower the alumina content of the formed slag to less than about 23% by the addition of silica in the form of sand, or by the addition of iron ore rich in silica, thereby to fluidize the slag. Unfortunately, the addition of such materials greatly increases the quantity of slag, and the fuel or power requirements for melting the slag become extraordinarily great. This, in turn, greatly increases the cost of manufacture.

In the present invention, however, high alumina and low silica are actually put to good use. This is because the slag is not made by a $CaO$—$SiO_2$ system as in the case of the usual melting practice, but rather by an $Al_2O_3$—$CaO$ system, by which economical smelting has been achieved. Specifically, the reduction to pig iron is effected by adding to the melted ore residue that remains after separation of the nickel values, from 15–30% by weight of a flux such as quicklime or limestone and 10–30% by weight of an agent high in alumina such as bauxite. This portion of the process, by which pig iron and alumina cement are simultaneously produced, is described in greater detail in the above-identified co-pending application of which the present application is a division, and need not be recited here in the same detail.

In order to enable those skilled in this art to practice the invention, the following illustrative example is given.

A laterite ore was selected that was produced in Samar Province in the Philippine Islands. It was dried to 3% uncombined water, and contained the following other constituents:

| | Percent |
|---|---|
| Fe | 53.0 |
| Cr | 1.82 |
| Ni | 0.76 |
| Mn | 0.81 |
| Cu | 0.003 |
| P | 0.05 |
| S | 0.12 |
| $Al_2O_3$ | 8.53 |
| Mg | 0.81 |
| CaO | 0.62 |
| $SiO_2$ | 2.67 |
| $H_2O$ (combined) | 8.0 |

This ore was pulverized to about 100 Tyler mesh, and 25 kg. of quicklime, 10 kg. of sodium chloride and 65 kg. of charcoal powder per 1000 kg. of the ore were mixed with this ore. The mixture was charged in a 250 kva. 3-phase electric furnace of the Héroult type and preferential reduction was carried out at about 1500° C. The electric furnace was lined with an electrically fused cast complex spinel refractory brick. The ferro-nickel fused and coalesced and collected at the bottom of the furnace and was easily separated from the melted ore residue by tapping in a continuous operation.

The ferro-nickel thus obtained contained 23% nickel. The impurities were as follows:

| | Percent |
|---|---|
| C | 0.03 |
| Si | 0.02 |
| Mn | Trace |
| P | 0.02 |
| S | 0.06 |
| Cr | 0.01 |

The composition of the melted ore residue was as follows:

| | Percent |
|---|---|
| Fe | 55.3 |
| Ni | 0.06 |
| Cr | 1.92 |
| CaO | 3.05 |
| $SiO_2$ | 2.82 |
| $Al_2O_3$ | 9.05 |
| $Na_2O$ | 0.04 |

The yield of nickel was 92%, and 29 kg. of the above identified ferro-nickel and 910 kg. of the melted ore residue were obtained per 1000 kg. of ore.

In the next phase, the reduction of pig iron from the melted ore residue was carried out in another 250 kva. 3-phase electric furnace of the same type. The smelting of the iron ore was carried out at about 1500° C. and 340 kg. of limestone, 250 kg. of bauxite and 500 kg. of coke per 1600 kg. of the melted ore residue were added. 1000 kg. of pig iron containing chromium and 600 kg. of slag were obtained. The mean tapping temperature was 1450° C. The composition of the bauxite that was used, the pig iron that was obtained and the resulting slag are as follows.

Bauxite:

| | Percent |
|---|---|
| Fe | 19.8 |
| Cr | 0.06 |
| P | 0.04 |
| S | 0.49 |
| $SiO_2$ | 4.48 |
| $Al_2O_3$ | 61.8 |
| CaO | 0.92 |

Pig iron:

| | |
|---|---|
| C | 4.31 |
| Si | 0.37 |
| Mn | 0.92 |
| Ni | 0.09 |
| Cr | 2.95 |
| P | 0.16 |
| S | 0.13 |

Slag:

| | |
|---|---|
| $Al_2O_3$ | 50.4 |
| Cao | 41.2 |
| $SiO_2$ | 5.21 |
| MgO | 1.92 |
| FeO | 2.02 |

The slag was utilized for the production of alumina cement as described in greater detail in the above-identified co-pending application of which the present application is a division, and the details of this process for making cement are omitted from the present application to avoid a prolixity of unclaimed subject matter.

From a consideration of the foregoing description, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In the method of recovering nickel and iron from laterite ores by preferential reduction in which ferro-nickel is produced as a dispersion of particles of liquid throughout a melt containing the remainder of the iron oxide; the improvement comprising incorporating in the melt a small but effective amount of alkali halide to cause the particles of ferro-nickel to coalesce into a body of liquid, and separating the body of liquid ferro-nickel from the remainder of the melt.

2. A method as claimed in claim 1, the alkali halide being present in an amount about 1% by weight of the melt.

3. A method as claimed in claim 1, the alkali halide being sodium chloride.

4. A method as claimed in claim 1, the alkali halide being potassium chloride.

5. A method as claimed in claim 1, in which the preferential reduction is conducted in an electric furnace, whereby the alkali halide improves the conductivity of the charge.

6. A method as claimed in claim 1, the application of heat during the preferential reduction being continued until the alkali halide is substantially entirely vaporized.

7. A method as claimed in claim 1, and smelting the remainder of the melt with lime to produce a chromium pig iron and alumina cement.

8. In the method of recovering nickel and iron from laterite ores by preferential reduction in which ferro-nickel is produced as a dispersion of particles of liquid throughout a melt containing the remainder of the iron oxide; the improvement comprising incorporating in the melt a small but effective amount of alkali halide to cause the particles of ferro-nickel to coalesce into a body of liquid, continuing the application of heat until the alkali halide is substantially entirely vaporized, separating the body of liquid ferro-nickel from the remainder of the melt, and smelting the remainder of the melt with lime to produce a chromium pig iron and an alumina cement substantially free from alkali halide.

References Cited in the file of this patent

UNITED STATES PATENTS

| 486,941 | Rossi | Nov. 29, 1892 |
| 711,059 | Long | Oct. 14, 1902 |
| 2,266,816 | Ruzicka | Dec. 23, 1941 |
| 2,395,029 | Baily | Feb. 19, 1946 |
| 2,811,434 | Moklebust | Oct. 29, 1957 |